Patented Nov. 12, 1929

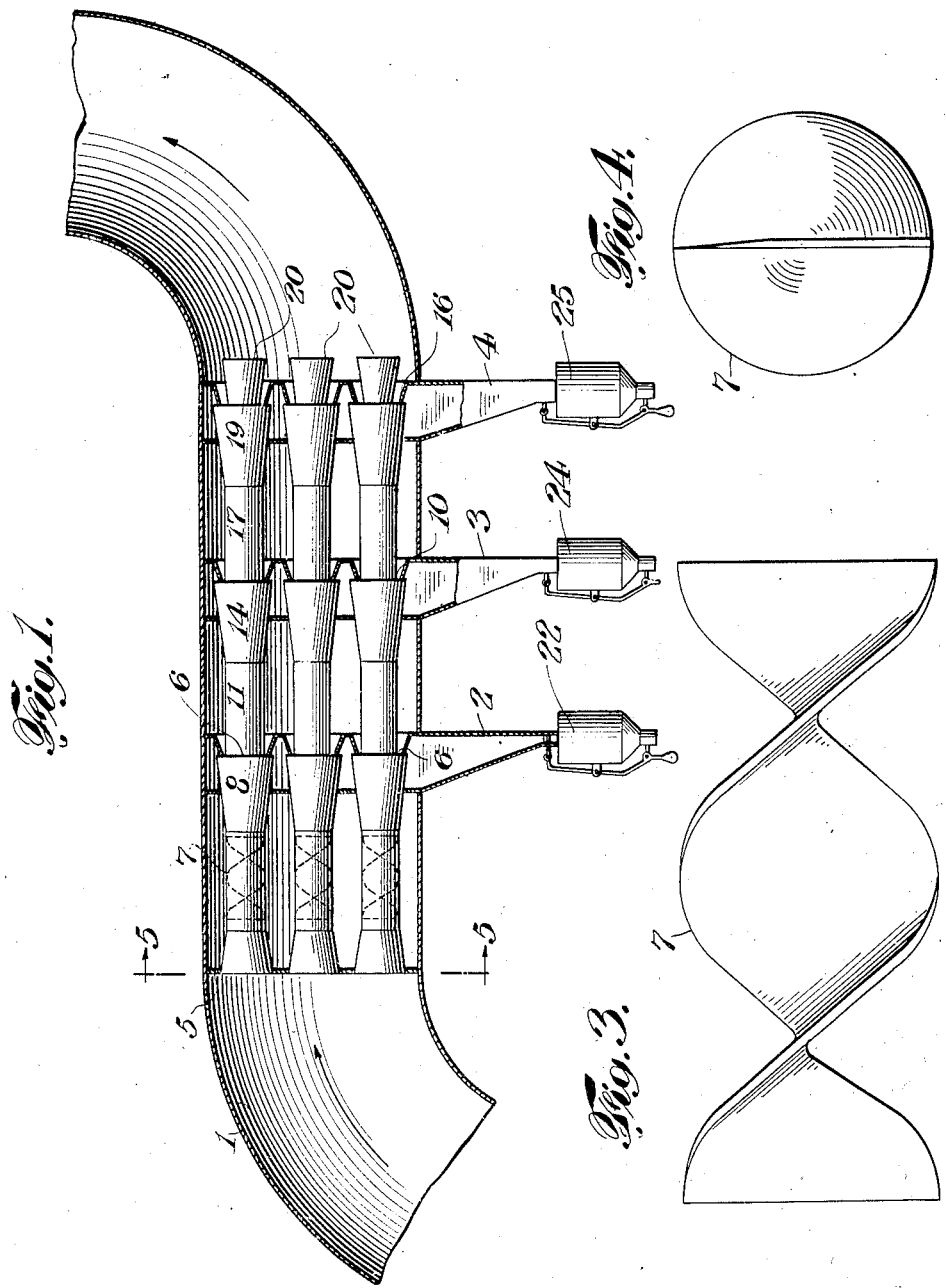

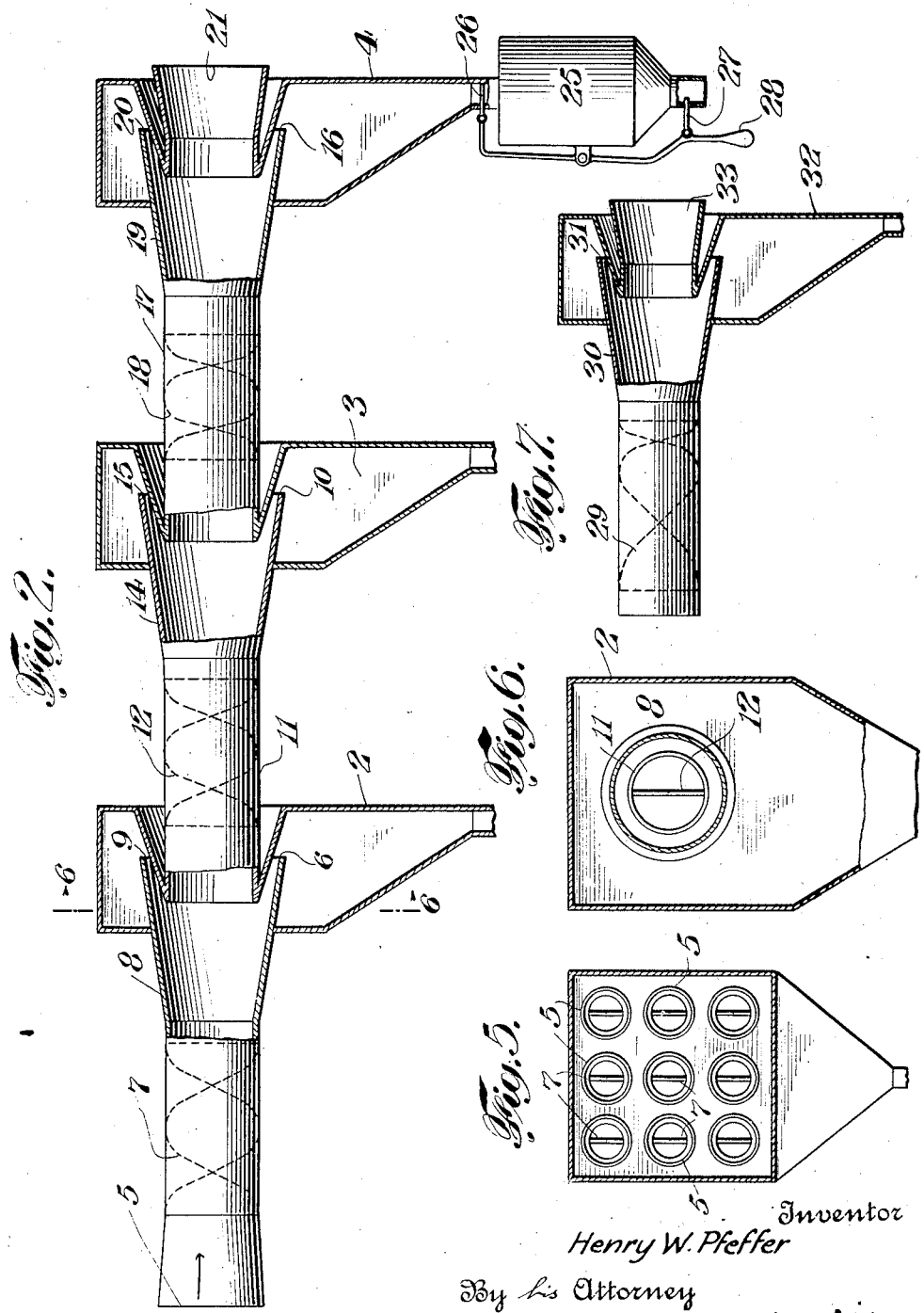

1,735,298

UNITED STATES PATENT OFFICE

HENRY WILLIAM PFEFFER, OF NARBERTH, PENNSYLVANIA, ASSIGNOR, BY MESNE ASSIGNMENTS, TO AMERICAN BLOWER CORPORATION, OF DETROIT, MICHIGAN, A CORPORATION OF DELAWARE

APPARATUS FOR COLLECTING DUST PARTICLES

Application filed February 9, 1927. Serial No. 166,823.

This invention pertains to a novel form of apparatus for separating and collecting dust from a moving column of dust laden air or gas. The invention also pertains to a novel method of separating and collecting this dust. The use of the term dust herein is preferably to be considered as meaning any dust or particles of minute or other size that are heavier than the air or gas in which they are in suspension.

Another object of the invention is to provide a novel construction of dust collector apparatus which permits the column of dust laden air or gas to flow in a substantially straight line, and that gives to the column of air thus flowing such a condition of flow that the dust particles will be concentrated at one or more points where they may be readily collected.

A still further object of the invention is to provide an improved construction of dust collector that, with minimum space and power requirement, will most efficiently separate and collect dust particles of different weights and sizes.

It will be particularly noted in the present invention that the column of air or gas may be readily placed in whirling condition with a minimum expenditure of power as the direction of flow of the column has not been changed. Advantage is taken of the difference in weights between the dust particles and the gas or air in which they are suspended so that the particles will be quickly brought to the periphery of the conduit and allowed to move into a collector.

The efficiency of the invention herein is further increased for the reason that the conduit is preferably divided into stages wherein particles of about the same weight may first be readily separated or thrown from the moving column of gas under a relatively low rate of whirling of the gas column in what may be termed the first stage of a collector. Particles of other weights are readily separated by increasing the rate of whirling of the gas in one or more other stages. This stage separation may be satisfactorily continued for several stages and arrangements provided for collecting the dust particles which are thrown against the inner wall of the conduit at each stage. It is preferred to have these stages located successively so that the column of air or gas passes out of one stage and into the next stage without changing the direction of flow of the air column. It will be understood that one Archimedean screw of varying pitch may be employed to separate the dust particles of different weights. Such construction would constitute a single stage collector and is adapted for collecting some types of dust.

It is preferred to have a series of the multiple stage conduits to thereby provide a dust collector of desired capacity and efficiency. Where there are more than one series of multiple stage collection, the dust collector may be understood to be a multiple series multiple stage collector.

For some uses it may be desirable to employ a single conduit of one or more stages. The preferred construction is such that each conduit shall be constructed so that the dust laden air may pass through the same in substantially a straight line thereby giving a stream like or substantially straight line flow of the air or gas.

In the improved dust collector herein disclosed and described, it has been found that when the air has a definite condition of flow, such as whirling, during its passage through the conduit, the turbulences, usually found in air passing through a conduit, have been very materially reduced.

Also in this preferred form of dust collector it is desired to construct the same so that the dust laden air or gas may be forced through the collector by the use of a fan, or the dust laden gas may be drawn through as would be the case if a fan is located beyond the dust collector. In some instances a fan is not needed as the draft created by the stack is sufficient to draw the gases through the collector.

In many instances it is preferred to locate the dust collector as near to the end of the boiler as possible for it has been found in practice in some cases that if the gases from the boiler have had an opportunity of becoming reduced in temperature there results a certain amount of condensation by reason of which some of the particles attach themselves to the walls of the conduit and in time will increase the resistance to the flow of gas through the collector. Such resistance adds to the amount of power required to operate the collector. By reason of the much smaller space occupied by the collector herein described, it will be readily understood that this collector may be placed very near the boiler, thereby practically preventing all of the fouling due to condensation.

From experience it has been found that the material to be separated will govern the maximum flow of dust ladened air or gas through the collector. This experience has shown that with some material there will be no further increase in collection efficiency when the rate of flow has passed above a predetermined number of feet per minute. For instance, power plant flue dust and sugar dust from a sugar drier will permit an increase in collection efficiency as the velocity increases from about 1000 feet per minute to about 3000 feet per minute, but above that point there is no increase in efficiency as the velocity increases. In the case of zinc dust or soap dust there is an increase of collection efficiency as the velocity is increased from about 1000 feet per minute to about 2000 feet per minute, but above that point the efficiency appears to fall off.

With such conditions and peculiarities thus existing, it will be seen that it is possible to construct and operate the improved collector herein described with certain variations as to the relative sizes of the various parts. It will, therefore, be understood that variations and modifications may be made in the preferred construction to efficiently collect any desired materials.

The preferred form of the invention is shown in the accompanying drawings wherein:

Fig. 1 is a partial sectional view in elevation of the improved dust collector mounted in a passageway;

Fig. 2 is a sectional view in part of one of the conduits for forming the dust collector illustrated in Fig. 1;

Fig. 3 is a view in elevation of an Archimedean screw employed in one of the conduits;

Fig. 4 is an end view of the Archimedean screw;

Fig. 5 is a sectional view taken on the line 5—5 of Fig. 1;

Fig. 6 is a sectional view taken on the line 6—6 of Fig. 2; and

Fig. 7 is an elevational view, partly in section, of a single stage collector having an Archimedean screw of varying pitch mounted therein.

Referring now to these drawings, a column of air or gas which is ladened with dust particles may be considered as entering passageway 1 at the left hand end thereof and passing through a series of multiple stage conduits assembled therein and as passing out of the passageway at the right hand end as noted by the arrow. It will be seen that the flow of the air or gas through the collector is substantially along a straight line.

During the passing of this column of dust ladened air through the collector it is given a definite condition of movement. This definite condition of movement is a whirling or revolving about its axis of flow and is preferably accomplished by placing an Archimedean screw in each each stage of each conduit. The screw causes the air to whirl as it flows along and the dust particles are thereby thrown by centrifugal force against the inner wall of the conduit where suitable means are provided for collecting the particles so separated or thrown. The preferred form of collecting or receiving means are containers 2, 3 and 4. It will be understood, however, that the air may be given a condition of movement by any other suitable means, or the air may enter the dust collector moving in a helicoid manner. It is preferred, however, to employ means associated with or mounted within the conduits for giving this preferred condition of flow of the air.

In describing in detail one of the preferred conduits which forms one of the multiple stage collectors, reference is particularly made to Fig. 2 wherein the dust ladened air or gas enters the conduit as indicated by the arrow. The first stage of the conduit will be considered as the portion between the points 5 and 6. This portion has therein for a part of its length the inclusion of an Archimedean screw 7 for giving the definite condition of flow to the passing air or gas. In this instance the definite condition consists of whirling or revolving about the axis of flow. By such whirling the dust particles will be thrown against the inner wall of the conduit where they may be readily collected as they flow along in contact with the wall of the conduit. The revolving of the air keeps the separated particles in contact with the conduit. Thus there is provided in association with the first stage a means for moving the dust ladened air in a particular condition of flow which causes the dust particles to be thrown to a location where they may be readily caught or received by any suitable means. It is to be understood that while an Archimedean screw is desirable to give such a definite motion to the air, other means for accomplishing this same result may be employed. The Archimedean screw is very desirable for it positively causes the air to revolve about its axis of flow and it positively causes the dust particles to be thrown against the inner wall of the conduit and be maintained in contact therewith even while they are flowing along.

In the particular desired form of conduit it is preferred to deform a part of the conduit to allow the particles to leave the column of air or gas and move to a place to be collected. The preferred form of deformation is obtained by taperingly expanding part 8 as shown. It will be seen that since the column of air is moving through the conduit the dust particles which have been separated or thrown out will pass along the periphery of part 8 and may be collected as they pass out of the conduit in a suitable manner. It is preferred to provide an orifice 9 at the end of the deformed or expanded part to allow the dust particles to pass from the conduit through the orifice 9 without changing their general direction of flow. This orifice may consist of an annular opening, or may be formed of a series of holes at or near the end of the expanded portion. Other or additional orifices may be provided at desired points. The conduit is then changed in diameter as illustrated, to bring it back to the original diameter to start the second stage which is to be considered as between the points 6 and 10. While the particular illustration shows that part 8 may not be an integral part of the second stage, it will be understood that with proper size and numbers of orifices 9 that part 8 and the first part 11 of the second stage may be integral thus continuing the conduit.

Any suitable means may be employed for collecting the particles as they flow through the orifice 9 and there is here provided the container 2 which receives the dust particles and permits them to settle to the bottom thereof. This container may sometimes be considered as a dust settling chamber. It is preferred to have the container 2 closed or sealed in order not to have a flow of the passing air or gas through this container or collector. With such construction the dust particles pass, first from the column of flowing air and then they pass into a chamber where there is no air travel, and there settle to the bottom and are later removed as will be described below.

The efficient operation of this container 2 of the dust collector has been found very satisfactory without requiring a certain amount of vacuum to be produced in it and, therefore, the pressure in the container is that which is normally produced by the normal passing of air through the collector. Heretofore in other dust collectors it has often been necessary to reduce the pressure in a dust settling chamber in order to obtain satisfactory operations.

The dust particles collected in the first stage will be particles of substantially the same weight as the Archimedean screw 7 gives a definite rate of whirling or revolving of the dust ladened air in that stage.

It is desirable to remove dust particles of another weight and this is accomplished in the second stage wherein there is provided another Archimedean screw 12 for causing the air to revolve about its line or axis of flow at a different rate than in the first stage. This Archimedean screw 12 is preferably of a different pitch than that of screw 7 in order to accomplish this different rate. It will be understood, however, that the Archimedean screw 12 may be of the same pitch as the Archimedean screw 7 and the diameter of part 11 of the second stage reduced thereby increasing the speed of flow of the air or gas, which will, therefore, cause a different rate or condition of flow of the air in the second stage. Due to this different rate, dust particles of another weight will be thrown against the periphery of the conduit.

Beyond the part 11 in the second stage of the conduit there is provided another deformed part 14 which is preferably taperingly expanded as in the first stage, and the dust particles thrown out by the air passing around the Archimedean screw 12 against the inner wall of the conduit will continue to flow along the tapering part 14 thereby passing out of the column of air and through an orifice 15 into the closed settling chamber or container 3 which simulates the closed container 2. Likewise, this closed container 3 is sealed and the dust particles will settle to the bottom thereof without being disturbed because there is no air travel through the container.

The third stage extending between points 10 and 16, it is preferred, is a substantial reproduction of either of the first two stages except as to the screw pitch. A part 17 of this stage is of substantially uniform diameter with that of part 11 and includes an Archimedean screw 18 which preferably has a pitch different than either of the screws 7 or 12. Likewise, there is a deformed part 19 which is taperingly expanded and provided at the end thereof with an orifice 20 through which the dust particles thrown out of the air column will pass to the settling chamber or container 4 as in the preceding stages.

The foregoing describes a three stage dust collector. Any number of stages may be employed and if desired different means may be employed in each stage to revolve the air. For the purposes of simple manufacture it is preferred to use the Archimedean screws and to have the conduit of equal diameter throughout its length except where it is deformed.

It is desired to place an exit member 21 at the end of the last stage and it is preferred to construct the same as shown in Fig. 2 so that the orifice 20 is satisfactorily formed. It is also desired that this exit member will also taperingly increase thus reducing the resistance to the flow of the air.

The deformed parts 8, 14 and 19 are preferably made of the tapering expansion formation as shown, but it will be understood, however, that these parts may be deformed in other ways which will permit the separated dust particles to pass out of the column of flowing air while the main flow of the air or gas is along a substantially straight line. It is preferred to have the beginning of the second stage located within the outlet mouth of the expanded part 8 of the first stage as is indicated in Fig. 2 wherein the left hand end of part 11 of the second stage is located within the part 8 of the first stage. The amount of this interlocation may be varied if desired, one satisfactory form being illustrated in the drawings.

It will be seen that the conduit, if desired, may be constructed of a single conduit or may be constructed of a series of separate lengths which may be assembled substantially in a straight line to permit a straight line flow of the air or gas through the collector. It will also be seen that the air or gas is positively revolved or whirled about its axis of general travel.

While the Archimedean screw is herein made use of it will be understood that other means may be employed for creating the positive condition of revolving or whirling of the column of air as it passes through the collector. The preferred construction of Archimedean screw is illustrated in Figs. 3 and 4.

For the purpose of ease of removing the dust particles which have been collected from the containers 2, 3 and 4 without permitting change of pressure conditions in each of those containers, it is desired to provide receptacles 22, 24 and 25 as illustrated in Fig. 1, and as illustrated in one instance in Fig. 2.

Referring particularly to receptacle 25 in Fig. 2, it will be noted that the end of container 4 is provided with a valve 26 and the end of the receptacle 25 is provided with a valve 27. A suitable interconnecting link mechanism between the two valves is provided so that when the handle 28 of the mechanism is moved to open valve 27, the valve 26 will automatically be closed. This illustrates one form of means for preventing the container 4 from being opened to the atmosphere during any running period of the collector. Any other form of interconnecting valves may be employed if desired. It will be understood that each of the receptacles 22 and 24 are provided with like valves and operating mechanisms.

In providing a series of these conduits of multiple stage collectors it is preferred to provide in the first stage of each conduit an Archimedean screw of substantially the same pitch and to enlarge the dust receiving chamber or container 2 so that all of the orifices of the first stage of each conduit will open into the same container. In the same manner container 3 receives all of the dust particles separated in the second stages. The same condition maintains as to container 4 of the third stages. If desired, however, each orifice may open into separate containers.

The particular multiple series multiple stage dust collector herein illustrated provides for nine conduits of three stages each and it has been found that it has given very satisfactory operation and exceptionally high efficiency in separating and collecting the dust particles from the column of flowing air or gas.

By maintaining the general flow of the air or gas in a substantially straight line and by removing the dust particles from the column of straight flowing air or gas, it has been demonstrated that a very high efficiency is obtained as well as a very material reduction in the operating cost. Further, this type of construction imposes very little resistance to the flow of air or gas whereas the dust collectors heretofore designed impose considerable resistance and, therefore, necessitate high operating expense and this requires additional power.

It will, therefore, be seen that an efficient multiple series multiple stage dust collector for a large number of purposes may be employed and it will also be seen that the number of stages or number of series may be readily increased or decreased depending upon the service desired. It is of especial importance to note that the size of the dust collector is particularly small in reference to collectors which have heretofore been designed, and it will further be noted that the efficiency of the present improved collector is particularly increased and is of itself very high.

In the single conduit collector illustrated in Fig. 2 there is shown several air whirling or rotating means spaced apart, these being Archimedean screws 7, 12 and 18. These screws being of different pitches give a varying rate of rotation to the column of flowing air. In Fig. 7 there is illustrated a modified form of collector, in this instance a single stage collector, and in which a single screw 29 of varying pitch is provided to accomplish the varying rate of whirling for the purpose of throwing out or separating dust particles of different weights from the column of flowing air. In this modified form there is also provided a deformed part 30, an orifice 31, a dust settling container 32, and an exit member 33.

It will be seen that in either form, i. e., Fig. 2 or Fig. 7, that the air is rotated at varying rates to separate dust particles of different weights and that there are means provided for collecting the dust particles so separated It will be understood that while there is here described in detail a particular embodiment of this invention for purposes of full disclosures, and some detailed features which are specifically claimed for a special advantage, many changes and modifications may be made in the particular construction and arrangement of parts without departing from the broad scope of this invention which is outlined in the following claims.

What is claimed is:—

1. A dust collector comprising a straight conduit through which air ladened with dust particles is passed, a plurality of means positioned in said conduit for whirling the air about its axis of flow, the whirling means being located at different points along the conduit, to purify the air at said points as it passes through the conduit, said conduit beyond each of said whirling means being taperingly expanded to permit the separated dust particles to pass from the flowing air column, said conduit being provided with orifices at the end of the expanded parts to permit the dust particles to pass from said conduit, and sealed containers connected to said conduit at the orifices for receiving the dust particles.

2. In a dust collector, the combination of a straight conduit of uniform diameter over the greater portion of its extent through which air ladened with dust particles is passed, said conduit being provided at intervals along its length with means for causing said air to revolve about its axis of flow, to purify the air at said intervals as it passes through the conduit, each of said revolving means causing the air to revolve at a different rate to throw dust particles against the inner wall of the conduit, said conduit being taperingly expanded for a short portion of its length beyond each of said revolving means to permit the separated dust particles to pass from the flowing column of air, said conduit being provided with orifices at each expanded part to permit the separated dust particles to pass from said conduit, and containers connected to said conduit at each orifice for receiving the dust particles.

3. A multiple stage dust collector through which a column of dust ladened air is passed, an Archimedean screw mounted in each stage and extending for a part of the length thereof for causing the air to be revolved about its axis of flow to throw the dust particles therefrom, each of said screws being of equal diameter and of different pitches, each stage being taperingly expanded to permit the dust particles thrown from the air to pass from said column of air, each stage being provided with orifices through which the dust particles may pass, and sealed containers connected to said orifices for receiving the dust particles.

4. A multiple stage dust collector through which a column of air ladened with dust particles is passed, said collector comprising a conduit, air revolving means located near the entrance of said conduit, a second air revolving means located in said conduit and spaced apart from the first revolving means and adapted to revolve the air at a different rate, said conduit being taperingly expanded at a point between said first and said second revolving means, said taperingly expanded part being provided with an orifice through which the dust particles separated by the whirling motion may pass, a sealed container for receiving said dust particles, said conduit being taperingly expanded at a point beyond the second revolving means, said second taperingly expanded part being provided with an orifice, another sealed container positioned at said second orifice for receiving said dust particles separated from the column of air as it passes beyond the second revolving means, and an exit part for said conduit.

5. In a multiple stage dust collector through which a column of dust ladened air is passed in a helicoid manner, a conduit having a part thereof taperingly expanded outwardly to a slight extent along which dust particles that have been separated from the column of air may flow, said conduit being reduced in diameter at the end of said tapered part to a diameter equal to the beginning diameter of said conduit, said tapered part being provided with an orifice substantially at its maximum diameter through which said dust particles may pass, a closed container associated with the orifice for receiving the dust particles, the second part of said conduit being of substantially equal diameter for a distance and then taperingly expanded outwardly and again reduced in diameter, said second tapering part being provided with an orifice near the greatest diameter thereof, and a second sealed container for communicating with said second orifice.

6. In a dust collector, the combination of a conduit through which a column of dust ladened air is passed, said conduit being divided into portions to form stages, an Archimedean screw positioned within one of said stages for revolving the air at a predetermined rate about its axis of flow, a part of this stage of the conduit being taperingly expanded beyond said screw to permit the dust particles which have been thrown against the inner wall of said conduit by the whirling to pass from said column of air, said conduit at its expanded portion being provided with an orifice through which the dust particles may pass, a sealed container connected to said conduit at said orifice to receive the particles passing therethrough, a second stage of said conduit having a part thereof of equal diameter with the first part of the first stage, a second Archimedean screw located in the second stage and having a pitch different from the screw in the first stage to thereby revolve the air at a different rate, a part of the conduit in said second stage being taperingly expanded beyond said second screw to permit the separated dust particles to pass from the column of flowing air, said second expanded part being provided with an orifice through which the separated dust particles may pass from said conduit, a second container connected to said conduit for receiving the dust particles passing from said second stage, and a third stage of said conduit having a part thereof of equal diameter with the first parts of the first and second stages, a third Archimedean screw positioned in said third stage and having a different pitch than the screws in the first and second stages, said conduit in said third stage being taperingly expanded beyond said third screw to permit the dust particles thrown from the air by said third screw to pass from the column of flowing air, said expanded portion in the third stage being provided with an annular orifice through which said dust particles may pass, a sealed container connected to said orifice for receiving the dust particles, and an exit member forming the end of said conduit and positioned in respect to said annular portion of said third stage to form the orifice therein.

7. In a multiple series multiple stage dust collector through which air ladened with dust particles is passed, a conduit made up of a series of stages, means comprising a screw in each stage of each series for throwing dust particles against the inner wall of the collector at each stage, and means at each stage for collecting the dust particles so separated, said means for collecting said particles being connected to like stages in each series of said collector.

8. In a multiple series multiple stage dust collector through which air ladened with dust particles is passed, a conduit made up of a series of stages, means comprising a screw in each stage of each series for throwing dust particles against the inner wall of the collector at each stage, means at each stage for collecting said dust particles, the means for collecting said particles being connected to like stages in each series of said collector, and means at the base of each collector means for permitting the removal of the dust particles without changing the air pressure in said collector means.

9. A multiple series multiple stage dust collector through which air ladened with dust particles is passed, the combination of a series of multiple stage conduits located in a passageway, Archimedean screws within the conduit in the first stage of each series for giving to the air passing therethrough a revolving motion to throw dust particles against the inner wall of that conduit, each of said conduits beyond said Archimedean screws being taperingly expanded, said expanding parts being provided with orifices, a sealed container connecting said orifices of each series for receiving the dust particles passing through said orifices, said conduits beyond the first stage being of diameter equal to that of the first stage, Archimedean screws within the conduit in each of said second stages for revolving the air at a different rate than in the first stages, the conduits in the second stages beyond the Archimedean screws being taperingly expanded, said expanded parts being provided with orifices through which dust particles may pass, a second sealed container connected to the orifices of the second stages for receiving the separated dust particles, said conduits beyond said second stage being of diameter equal to that of the first and second stages, Archimedean screws within the conduit in said third stages for revolving the air at a different speed than in either of the other stages, the conduits in said third stages beyond said Archimedean screws being taperingly expanded, said expanded parts being provided with orifices through which the separated dust particles may pass, a third sealed collector connected to each of the orifices in the third stages for receiving the dust particles, and exit members located at the ends of the third stages and being taperingly expanded beyond the ends of said third stages.

10. In a dust collecting apparatus, a common dust collecting casing, a plurality of delivery tubes emptying therein having screws therein for rotating the dust laden air, said delivery tubes having flared open ends emptying into the dust collector casing, cone-shaped guards mounted in said dust collector casing projected into the mouths of said tubes to form a narrow passageway therebetween for the exit of dust into the dust collector casing and air exit tubes having their open ends within the flaring ends of the delivery tubes and supported by said cone shaped guards.

11. In a multiple stage dust collector through which air laden with dust particles is passed, a conduit having a plurality of stages, means comprising a screw in each stage for throwing the dust particles in the air passing therethrough outwardly towards the walls of the conduit, said screws in the several stages being of different pitches, and means at each stage for collecting the dust particles so separated, said collecting means comprising a plurality of receptacles, one for each stage.

HENRY WILLIAM PFEFFER.